United States Patent [19]

Breuer et al.

[11] Patent Number: 5,780,420
[45] Date of Patent: Jul. 14, 1998

[54] SILICATE-BASED BUILDERS AND THEIR USE IN DETERGENTS AND MULTICOMPONENT MIXTURES FOR USE IN THIS FIELD

[75] Inventors: Wolfgang Breuer, Korschenbroich; Volker Bauer, Duesseldorf; Joerg Poethkow, Duesseldorf; Beatrix Kottwitz, Duesseldorf; Jochen Jacobs, Wuppertal; Hans Dolhaine, Duesseldorf; Wolfgang Seiter, Neuss; Birgit Stevermann, Gelsenkirchen; Horst Upadek, Ratingen, all of Germany

[73] Assignee: Henkel Kommanditgesellschaft auf Aktien, Duesseldorf, Germany

[21] Appl. No.: 666,309

[22] PCT Filed: Dec. 27, 1994

[86] PCT No.: PCT/EP94/04322

§ 371 Date: Aug. 5, 1996

§ 102(e) Date: Aug. 5, 1996

[87] PCT Pub. No.: WO95/18766

PCT Pub. Date: Jul. 13, 1995

[30] Foreign Application Priority Data

Jan. 3, 1994 [DE] Germany ............... 44 00 024.3

[51] Int. Cl.⁶ ............... C11D 3/38; C11D 17/00; C11D 14/02
[52] U.S. Cl. ............... 510/466; 510/276; 510/309; 510/316; 510/317; 510/348; 510/457
[58] Field of Search ............... 510/276, 309, 510/316, 317, 348, 457, 466

[56] References Cited

U.S. PATENT DOCUMENTS

| | | | |
|---|---|---|---|
| 3,838,192 | 9/1974 | Bertoreli et al. | 423/334 |
| 3,838,193 | 9/1974 | Kajitani et al. | 423/531 |
| 3,879,527 | 4/1975 | Bertorelli et al. | 423/332 |
| 3,912,649 | 10/1975 | Bertorelli et al. | 252/135 |
| 3,918,921 | 11/1975 | Pierce | 23/313 |
| 3,956,467 | 5/1976 | Bertorelli | 423/332 |
| 4,011,302 | 3/1977 | Defrawi | 423/332 |
| 4,806,327 | 2/1989 | Hans-Peter et al. | 423/332 |
| 4,950,310 | 8/1990 | Hans-Peter et al. | 34/295 |
| 5,096,609 | 3/1992 | Dany et al. | 252/135 |
| 5,229,095 | 7/1993 | Schimmel et al. | 423/334 |
| 5,236,682 | 8/1993 | Schimmel et al. | 423/334 |
| 5,268,156 | 12/1993 | Schimmel et al. | 423/334 |
| 5,308,596 | 5/1994 | Kotzian et al. | 423/333 |
| 5,482,642 | 1/1996 | Agar et al. | 252/90 |
| 5,501,814 | 3/1996 | Engelskirchen et al. | 252/174.17 |
| 5,534,348 | 7/1996 | Miller et al. | 428/402 |

FOREIGN PATENT DOCUMENTS

| | | |
|---|---|---|
| 205 070 | 12/1986 | European Pat. Off. . |
| 320 770 | 6/1989 | European Pat. Off. . |
| 425 427 | 5/1991 | European Pat. Off. . |
| 425 428 | 5/1991 | European Pat. Off. . |
| 444 415 | 9/1991 | European Pat. Off. . |
| 488 868 | 6/1992 | European Pat. Off. . |
| 502 325 | 9/1992 | European Pat. Off. . |
| 525 239 | 2/1993 | European Pat. Off. . |
| 542 131 | 5/1993 | European Pat. Off. . |
| 548 599 | 6/1993 | European Pat. Off. . |
| 561 656 | 9/1993 | European Pat. Off. . |
| 2157 943 | 6/1973 | France . |
| 42 21 381 | 2/1994 | Germany . |
| 43 00 772 | 7/1994 | Germany . |
| 43 19 578 | 12/1994 | Germany . |
| 43 30 393 | 3/1995 | Germany . |
| 58/217598 | 12/1983 | Japan . |
| WO 90/13533 | 11/1990 | WIPO . |
| WO 93/08251 | 4/1993 | WIPO . |
| WO 93/16110 | 8/1993 | WIPO . |

*Primary Examiner*—Mukund J. Shah
*Assistant Examiner*—Brenda Coleman
*Attorney, Agent, or Firm*—Ernest G. Szoke; Wayne C. Jaeschke; Real J. Grandmaison

[57] ABSTRACT

The invention relates to sodium silicates with a modulus (molar ratio of $SiO_2$ to $Na_2O$) of 1.3 to 4 in the form of a fine-particle solid in shard-like form or compounds containing these silicates with the ability to reduce incrustation when used as a builder component in detergents. These useful materials are distinguished in particular by the fact that they are in the form of an X-ray amorphous overdried material (primary drying product) with water contents below 15% by weight and apparent densities of the non-compacted solid granules of 500 g/l or lower which has been produced by drying of a water-containing sodium silicate preparation using a hot gas phase as the drying medium and/or by heating of a spray-dried sodium silicate with water contents of at least 15% by weight at temperatures of 120°to 450° C., if necessary accompanied or followed by the application of forces to produce the shard-like structure.

The invention also relates to multicomponent mixtures from the field of solid detergents or multicomponent compounds suitable for this field of application which are characterized by the presence of the sodium silicates defined above.

24 Claims, No Drawings

5,780,420

SILICATE-BASED BUILDERS AND THEIR USE IN DETERGENTS AND MULTICOMPONENT MIXTURES FOR USE IN THIS FIELD

This application is a 371 of PCT/EP 94/04322 filed Dec. 27, 1994.

BACKGROUND OF THE INVENTION

1. Field of the Invention

The teaching according to the invention relates to useful materials and mixtures of useful materials from the field of detergents. More particularly, the teaching according to the invention is concerned with, but not confined to, the field of laundry detergents.

Detergents of the type in question, more particularly corresponding solid concentrates, contain so-called builders or builder systems together with washing-active surfactants as principal components in addition to other typical auxiliaries and additives. In detergents, builders or builder systems perform a number of functions which have changed considerably with the constant changes in the composition, formulation and production of detergents over recent years and decades. Modern detergents now contain around 20 to 50% by weight of builders. Accordingly, builders are among the most important substances for the production of detergents.

In view of this diversity and evolution of detergent systems, builders have to perform many functions which have never been completely or quantitatively defined. However, the main requirements are well documented and include, above all, softening water, enhancing detergency, inhibiting redeposition and dispersing soil. Builders are intended to contribute towards the alkalinity required for the washing process, to show a high absorption capacity for surfactants, to improve the effectiveness of surfactants, to make positive contributions to the properties of solid products, for example in powder form, and hence to have a structure-building effect or even to ease dust emission problems. These various requirements cannot normally be satisfied by a single builder component on its own, so that a system of builders and co-builders is generally used.

For ecological reasons arising out of the eutrophication of waters or the remobilization of heavy metals, phosphorus- and/or nitrogen-containing builders or builder systems as detergent components have been the target of considerable criticism with the result that, today, the three-dimensionally crosslinked, water-insoluble sodium alumosilicate, zeolite NaA, is now being widely used, particularly in laundry detergent formulations. Unfortunately, so-called co-builders have to be used on a wide scale with zeolite NaA, particularly in laundry detergents, above all to counteract unwanted incrustations. Polymeric polycarboxylates, more particularly copolymers based on acrylic acid and maleic acid, in conjunction with soda are now widely used for this purpose together with zeolite NaA. Complexing agents are also frequently used.

2. Discussion of Related Art

Recently, pure silicate-based systems, such as the crystalline layer-form disilicates—so-called SKS types (commercial products of Hoechst AG, Federal Republic of Germany)—or combinations of such components with soda have also been described for use as builders or co-builders, cf. for example EP-A-0 205 070, EP-A-0 320 770, EP-A-0 425 428, EP-A-0 502 325 and EP-A-0 548 599, which all describe the production of crystalline layer-form sodium silicates. In addition, EP-A-0 488 868 and EP-A-0 561 656 describe combinations of silicates and soluble inorganic salts, such as sodium carbonate, sodium sulfate, sodium borate or perborate, and other compounds of this type as builders.

Neither zeolite A nor the crystalline layer silicates satisfy all performance requirements. In the case of zeolite A, certain performance-related disadvantages are attributable to its insolubility which, on account of technical changes to washing machines with increasingly smaller liquor volumes, can lead to problems concerned with dispersion and washing out. Its magnesium binding capacity is also relatively poor.

By contrast, crystalline disilicates are only capable of taking up nonionic surfactants in small quantities. In addition, crystalline disilicates are vulnerable to heat damage which can give rise to disadvantages in regard to the spray-drying processes used for the manufacture of washing powders. Moreover, the production of defined disilicate phases is comparatively complicated.

At the time zeolite NaA was being developed as a builder, it was proposed to use selected water-soluble amorphous sodium silicate compounds as builders in detergents, cf. for example U.S. Pat. Nos. 3,912,649, 3,956,467, 3,838,193 and 3,879,527, which describe amorphous sodium silicate compounds as builders which are produced by spray drying of aqueous waterglass solutions, subsequent grinding and then compaction and spheronizing with additional removal of water from the ground material, cf. for example FIG. 3 of U.S. Pat. No. 3,912,649. The water content of the products used is in the range from about 18 to 20% by weight for apparent densities well in excess of 500 g/l.

EP-A-0 444 415 proposes detergents containing 5 to 50% by weight of at least one surfactant, 0.5 to 60% by weight of a builder and typical detergent ingredients, characterized in that an amorphous low-water sodium disodium disilicate with a water content of 0.3 to 6% by weight is used as the builder. In a preferred embodiment, the amorphous sodium disilicate is said to contain 0.5 to 2% by weight of water. These substantially water-free amorphous disilicates are produced by a multistage process which initially comprises producing a powder-form amorphous sodium silicate with a water content of 15 to 23% by weight. This material is treated with waste gas in countercurrent in a rotary kiln at temperatures of 250° to 500° C. The amorphous sodium disilicate issuing from the rotary kiln is size-reduced by a mechanical crusher to particle sizes of 0.1 to 12 mm and subsequently ground in a mill to particle sizes of 2 to 400 μm.

By contrast, the teaching of EP-A-0 542 131 seeks to produce a dried sodium silicate containing water of crystallization—suitable for use as a builder component—with a free water content of 5 to 12% by weight in a single process step by treatment of a 40 to 60% by weight aqueous solution of the sodium silicate with hot air in a turbodryer equipped with impact tools. The drying product passes through a pseudoplastic state which is used to produce a product in granular form. The granules are dried under working conditions which rule out the possibility of embrittlement of the outer shell of the granules and, hence, disintegration of the structure of the granules. It is possible in this way avoiding—the so-called "popcorn effect"—to produce water-soluble sodium silicates with specific gravities of 0.5 to 1.2 which are distinguished by complete solubility in water at ambient temperature.

The problem addressed by the present invention was to provide a multifunctional builder based on sodium silicate which would be distinguished by a hitherto undescribed combination of properties and associated practical advantages.

DESCRIPTION OF THE INVENTION

In a first embodiment, therefore, the present invention relates to sodium silicates with a modulus (molar ratio of $SiO_2$ to $Na_2O$) of 1.3 to 4 in the form of an absorbent, fine-particle solid in shard-like form with the ability to reduce incrustation when used as a builder component in detergents. The sodium silicates according to the invention are distinguished in particular by the fact that they are in the form of an X-ray amorphous overdried material— hereinafter also referred to as a "primary drying product"— with water contents below 15% by weight and apparent densities of the non-compacted solid granules of 500 g/l or lower which has been produced by drying of a water-containing sodium silicate preparation using a hot gas phase as the drying medium and/or by heating of a spray-dried sodium silicate with water contents of at least 15% by weight at temperatures of 120° to 450° C., accompanied or followed by the application of forces to produce the shard structure. Crucial importance attaches to the shard structure. In the context of the invention, shards are understood to be trough-like half shells with a broken edge which preferably vary from 10 to 200 μm in particle size, particle sizes of 20 to 120 μm being preferred and particle sizes of 50 to 100 μm being particularly preferred. The shells preferably have a wall thickness of 1 to 5 μm. Size-reduced egg shells may be used as a macroscopic comparison structure.

In another embodiment, the invention relates to solid detergents with apparent densities of at least about 700 g/l which contain surfactants in admixture with detergency-boosting builder components together with other auxiliaries and/or useful materials and free-flowing, pourable mixtures of useful materials for use in the field mentioned above, containing one or more builder component(s) which are at least partly based on water-soluble sodium silicates with a modulus of 1.3 to 4 in admixture with other useful materials and/or auxiliaries from the field in question. These multi-component mixtures are distinguished by the fact that they contain water-soluble X-ray amorphous sodium silicates, which have been produced by drying of water-containing sodium silicate preparations to form an overdried free-flowing solid with residual water contents below 15% by weight and apparent densities of at most 500 g/l, as a mixture component, above all for promoting and/or enhancing the reduction of incrustation, i.e. for improving secondary washing or cleaning power. The X-ray amorphous sodium silicates present in the mixture have the shard form mentioned above and are distinguished in particular by the presence of microcrystalline zones. Using transmission electron micrographs, it can clearly be shown that the X-ray amorphous silicates according to the invention contain more and larger crystalline zones than conventional spray-dried silicates, especially Portil® A (sodium disilicate, a product of Henkel KGaA), the crystalline centers in Portil® A mainly being monocrystals (diffraction points) and—only to a limited extent—polycrystalline zones (diffraction rings) by comparison with the silicates according to the invention and the number of monocrystals and polycrystalline zones being significantly smaller than in the silicates according to the invention.

Finally, the invention relates to the use of the above-mentioned X-ray amorphous, overdried sodium silicates with moduli in the above-mentioned range and residual water contents below 15% by weight as multifunctional mixture components with a builder effect and a high absorption capacity for free-flowing auxiliaries and useful materials in mixtures of the type used for solid detergents or detergent compounds. The X-ray amorphous overdried sodium silicates to be used in accordance with the invention are distinguished in particular by the following combination of properties: apparent densities of 500 g/l or lower, specific BET surfaces of at least 5 $m^2$/g and a cumulative volume of at least 100 $mm^3$/g. Crucial elements of this definition are determined or established by the above-mentioned shard structure of the overdried X-ray amorphous sodium silicate.

PARTICULARS OF THE TEACHING ACCORDING TO THE INVENTION

The determining element linking the various embodiments of the teaching according to the invention is the builder component based on sodium silicate. The primary object of the invention in this regard was to provide a solid component for detergents which, on the one hand, would be distinguished by its multifunctionality, but which on the other hand would open up new and improved possibilities both in the production of detergents in the forms required today and in the practical application of these detergents. Accordingly, the key parameters of this determining component so far as the teaching according to the invention is concerned are discussed first in the following.

The sodium silicate builder used in accordance with the invention is a fine-particle solid distinguished by high and rapid solubility in water and by a number of selected and interrelated parameters. It can be produced in different ways from waterglass solutions with the parameters mentioned in the following or even from conventionally produced, i.e. in particular by spray drying, solid free-flowing sodium silicate powders.

A first important determining element of the builder component according to the invention is its X-ray amorphous structure. Amorphous alkali metal silicates have long been used in detergents, their function essentially being to provide the alkalinity required for the washing process. In commercial detergents, amorphous sodium silicates are used in the form of spray-dried waterglasses with a modulus ($SiO_2$ to $Na_2O$ ratio by weight) of around 2 to 3.5. These solid powders normally contain around 18 to 20% by weight of water and are distinguished inter alia by the fact that they have only a very small specific BET surface (DIN 66131) of well below 5 $m^2$/g. Their cumulative volume, as determined by mercury porosimetry measurements (in accordance with DIN 66133), is also very small, normally reaching values of up to 50 $mm^3$/g. The absorption capacity of these spray-dried waterglasses for liquid components, for example nonionic surfactants, is extremely low. Even additions of 5% by weight of the nonionic surfactant cause the solids to lose their powder properties and to stick to one another. Although the fine-particle solid builders now used in accordance with the invention may overlap with the corresponding values of commercial waterglasses in solid form in a number of parameters, they differ fundamentally from these commercial waterglasses in the sum total of their properties.

The builder components according to the invention are X-ray amorphous sodium silicates with a modulus in the range from 1 to 4 typically used in the field in question, more particularly in the range from 1.3 to 3.7. Particular significance attaches to modulus values of at least 1.5 and, more particularly, in the range up to 3.3. Preferred other lower limits for the modulus range are 1.7 and, more particularly, 1.9 while other preferred upper limits to the modulus values are 3.0 and, more particularly, 2.7. Hitherto, particular significance has been attributed to modulus values of around 2 (i.e. to the disilicate compounds) in the practical application of amorphous waterglasses in solid form in detergents. Waterglasses with this modulus value are also suitable for the purposes of the invention. However, important embodiments of the invention are characterized by the use of sodium silicate builders or builder mixtures which deviate at least partly from this modulus value, but otherwise lie within the limits mentioned. In this case, preferred embodiments are characterized in that at least 5% by weight and, more particularly, at least 10 to 20% by weight of the X-ray amorphous sodium silicate builder deviates from the modulus value of 2.

Another important determining element for the builder components defined in accordance with the invention is their water content. According to the invention, the fine-particle sodium silicates are used in overdried form. Products with water contents of less than 15% by weight are particularly suitable, particular significance attaching to water contents in the range from about 1 to 13% by weight and, more especially, to water contents of the order of at least 3% by weight. In one important embodiment, the overdried X-ray amorphous sodium silicates with a modulus value in the range mentioned above have water contents above about 6% by weight and, more particularly, in the range up to about 13% by weight or below 15% by weight.

Overdried sodium silicates of this type are distinguished by extremely low apparent densities for a primary drying product. Accordingly, sodium silicate builders of the described type with apparent densities of 500 g/l or lower and, more particularly, of at most about 400 g/l are preferred for the purposes of the invention. Apparent densities of the primary drying product below the last-mentioned figure can be particularly preferred, a range of 100 to 350 g/l being particularly suitable for the apparent density.

A primary drying product of this type based on sodium silicate can be produced by a number of processes which will be discussed in detail hereinafter. Irrespective of the particular processes used for their production, these preferred forms of the fine-particle sodium silicate according to the invention are distinguished by high BET surfaces (DIN 66131) and by high cumulative volume values (DIN 66133). The BET surface of particularly useful builders according to the invention is at least about 5 $m^2/g$, particular significance attaching to lower limits to the BET surface of from at least about 7.5 $m^2/g$ and, more particularly, from at least about 10 $m^2/g$ to—for example—around 20 $m^2/g$. The cumulative volume of these builders in the form of the primary drying product is generally at least 100 $mm^3/g$, corresponding values of at least 150 $mm^3/g$ and, more particularly, of at least 200 $mm^3/g$ being particularly preferred.

The last-mentioned parameters of low apparent densities and high BET surfaces and cumulative volumes are related to the structure of the solid material. Materials of the type in question are generally an overdried and hence embrittled waterglass which has been broken up by suitable process measures to form a shard-like material. The development of this shard structure leads to the important physical properties referred to herein. The preliminary embrittlement by overdrying obviously has an important influence on the performance properties of the builder components according to the invention in the detergent as a whole. In addition to the improvement in primary washing power, the increased inhibition of incrustation and, hence, the improvement in the so-called secondary washing power of laundry detergents, for example, are particularly noticeable in this regard.

The solubility and dissolving rate of the builder components according to the invention in water are basically good. However, the following special feature has been observed: silicate dissolves after the alkali. This is an important difference in relation to existing commercial products and may well be responsible for the improvement in secondary washing power. The primary drying product preferably has a dissolving rate of at most about 1 minute under standard conditions (95% by weight/40° C.).

The absorption capacity of the primary drying product as defined in accordance with the invention for liquid components is surprisingly high. The shard structure in the three-dimensional form of the primary drying product presumably plays an important part in this regard, too. For example, at least 40% by weight or 50% by weight, based on the weight of the alkali metal silicate builder, of liquid components, such as corresponding nonionic surfactants, can be applied in suitable mixing units. In important embodiments of the builder components according to the invention, the liquid components can be absorbed in equal quantities. It is even possible to introduce and bind at least twice the quantity by weight of liquid component, based on the weight of the sodium silicate builder defined in accordance with the invention.

The sodium silicates overdried in the sense of the teaching according to the invention may be produced both from water-containing, free-flowing sodium silicate preparations and from already existing dry forms of the sodium silicate, more particularly from a spray-dried sodium silicate. It is crucial that the water be sufficiently removed from the material to be dried into the range of the overdried sodium silicate as defined by the figures mentioned above. The sufficient reduction in the water content required in accordance with the invention can be achieved in particular by treating the fine-particle material at temperatures sufficiently above 100° C. Temperatures of up to at most 500° C. and preferably in the range from 120° to 450° C. are particularly suitable. Embrittled layers of the sodium silicate are initially formed—for example correspondingly embrittled hollow beads of a spray-dried product—and break up on exposure even to moderate shear or impact forces to form the required hollow bead shard structure. In one important embodiment, the invention thus provides sodium silicates with the parameters mentioned above which have been produced by drying of a water-containing sodium silicate preparation using a hot gas phase as the drying medium, for example by spray drying and subsequent heating, and/or by heating of a spray-dried sodium silicate with water contents of at least 15% by weight at temperatures of up to 500° C. and preferably in the range from 120 to 450° C., accompanied or followed if necessary by the application of forces to develop the shard structure. The drying of the water-containing material to form the overdried material required for the purposes of the invention and its destruction to form the shard structure can be carried out in a single process step, i.e. in machines which are capable of additionally introducing mechanical energy into the material to be dried, or even separately from one another.

One example of the production of the solid builders according to the invention in a single step lies in the use of turbodryers which, in particular, may be equipped with impact tools of the type described, for example, in EP-A-0 542 131 cited at the beginning. In contrast to the teaching of this document, however, a turbodryer of the type in question is now operated in accordance with the invention under conditions which do not keep the granular structure intact, but instead lead to the controlled production and breaking up of inflated particles. However, even the combination of the spray drying of liquid waterglass solutions to form a free-flowing solid and subsequent heating at temperatures of, for example, 200° to 450° C. leads to the increase in the surface of the solid material required in accordance with the present invention. Under the effect of the energy additionally introduced, for example, in mixing, grinding or kneading units, the overdried material then breaks up as required to create the large specific surface required for liquid components.

It is characteristic of the X-ray amorphous primary drying products as defined in accordance with the invention that microcrystalline components can be detected by electron diffraction. In the context of the present invention, microcrystallinity means that, although short-range orders of the individual structural elements are present, overlapping long-range orders are missing, so that no reflexes appear in the X-ray diffraction spectrum, enabling the silicates to be characterized as X-ray amorphous.

As mentioned at the beginning, there are further embodiments of the invention in which the overdried sodium silicate builders defined in the foregoing in regard to their properties are used as a constituent of, in particular, solid detergents or as a constituent of compounds for the production of detergents. In these embodiments, the teaching according to the invention encompasses virtually any combination of materials in which the multifunctional combination of parameters is to be at least partly utilized.

So far as the development and making up of solid detergents or detergent compounds is concerned, the builder components defined in accordance with the invention can be particularly important mixture components when mixture components liquid at room temperature and/or at the processing temperature are to be incorporated in considerable quantities in the mixture of active substances. The high BET surfaces and the available cumulative volume of the builders according to the invention provide for the effective adsorption of liquid components without any loss of the powder properties of the solids. This applies in particular even to elevated temperature ranges encountered in the production of the preparations solid at room temperature in which mixture components which are basically solid at room temperature are liquefied, for example through melting.

However, not only is this ability to bind and hence—so to speak—solidify large quantities of liquid advantageous in terms of practical application, another advantage is afforded in regard to the introduction of the mixture into the water-containing liquor, namely: the thorough permeation of a component dissolving in water, for example, with delay by the readily water-soluble inorganic builder in shard form as defined in accordance with the invention leads to an immediate dispersion aid during the dissolution of the heavy water-soluble material absorbed. This affords important process-related and performance-related advantages, for example in the production and making-up of detergents in the highly compacted form now required and demanded by the consumer and by the market. The highly compacted detergent extrudates now available are mentioned purely by way of example in this regard.

Particular significance is attributed to the structure-imparting builders according to the invention in shard form for binding and absorbing liquid components from the production of detergents. Examples of such components include nonionic surfactant compounds which are liquid at room temperature or moderately elevated temperatures, water-containing anionic surfactant pastes or preparations and also melts or plasticized, highly concentrated anionic surfactants, foam inhibitors, such as silicones and/or paraffins, and also fabric softener formulations for use in domestic and institutional detergents. Not only does the thorough mixing of the liquid components with the inorganic component of large specific surface and the possibility of maintaining this mixed state throughout the production of the detergents ensure the required solidification of the mixture of useful materials, the function of the particular useful-material component is also safeguarded during incorporation in the aqueous wash liquor by the highly water-soluble builder component with its large specific surface. The builder components used in accordance with the invention all have high calcium and magnesium binding capacities, generally of at least 4 mval/g product (expressed as the water-free substance). The ability even of active substances sensitive to water hardness to function on initial contact with surrounding aqueous phase in the wash liquor is thus optimized and guaranteed. It can immediately be seen that important starting aids are thus provided for the following steps of the washing process. However, this also explains a crucial aspect in which the teaching according to the invention differs from the prior art: the particulate form of the builder components based on sodium silicate described and used in accordance with the invention is characterized inter alia by the large accessible surface associated with the shard form. So far as the reaction by which the detergent mixture dissolves in the wash liquid and the primary reactions involved in the interaction between the aqueous liquor and the mixture of useful materials are concerned, this leads to important advantages over comparable mixtures in which the builder components are present or used in the form of small, largely rounded particles with—overall—a significantly reduced surface.

In the field with which the invention is concerned, i.e. mixtures of the X-ray amorphous builders based on sodium silicate according to the invention with other useful materials and/or auxiliaries from the field of detergents, the quantity ratios of builder to useful material and/or auxiliaries (mixtures) present in the particular mixture are determined by the application envisaged taking general specialist knowledge into consideration. Individual characteristic cases are mentioned purely by way of example in the following:

In final detergent formulations, the builder content is normally in the range from about 15 to 60% by weight, based on the total weight of the detergent. In this case, alkali metal silicate builders formulated in accordance with the invention may make up the entire builder component. However, builder components formulated in accordance with the invention may also be used solely as part of a mixture containing other mixture components with builder properties known per se. A deciding factor in this regard is inter alia the desired function to be performed by the builder components defined in accordance with the invention in the detergent as a whole. If primarily liquid active-substance components, which are added in particular in comparatively small quantities (for example foam inhibitors), are to be introduced in solidified form into the mixture as a whole, the content of alkali metal silicate builders according to the invention in detergents such as these may be comparatively small. In this case, use is primarily made of the high absorption capacity of the material defined in accordance with the invention for liquid phases. The circumstances are totally different when the builders defined in accordance with the invention perform the predominant or even the sole builder function in the detergent for the particular practical application envisaged. In this case, comparatively large parts of the multicomponent mixture will be formed by the sodium silicates defined in accordance with the invention.

The mixing of the builder components according to the invention with liquid or molten useful materials and/or auxiliaries offsets the disadvantage found in modern detergent technology for the overdried sodium aluminium silicates present in shard form which is expressed in their low apparent density. Through the absorption of the useful materials and/or auxiliaries in liquid form, the apparent density of the combined material can be freely varied within very wide limits. Thus, the builder components can even be used in modern detergents with apparent densities of at least about 700 g/l.

Although the mixing of the builder components defined in accordance with the invention with liquid useful materials and/or auxiliaries at least in a first processing stage can be a preferred measure, particularly in the interests of adequate compaction of the material, the teaching according to the invention is by no means limited to this form of mixing. Direct mixing with solids also affords important advantages which can lie in particular in the use of the multicomponent mixtures as detergents. The ability of the described builder components to reduce incrustations and hence to improve the secondary washing power of, in particular, laundry detergents is especially important in this regard. By choosing the modulus—in accordance with the remaining composition of the multicomponent mixture and the application envisaged—the effect of the builder components can be optimized in known manner. In addition, the invention proposes using mixtures of different builder components as defined in accordance with the invention which differ in particular in their respective modulus values. The overall effect can be further optimized in this way.

Mixture components which may be used in the multicomponent mixtures according to the invention are listed in the following without any claim to completeness. Basically, the entire range of useful materials and auxiliaries from the field of detergents is available for this purpose, including anionic, nonionic, cationic, amphoteric and/or zwitterionic surfactants and other inorganic and/or organic builders, bleaching agents and bleach activators, enzymes and enzyme stabilizers, foam inhibitors, optical brighteners, inorganic alkaline salts and/or salts reacting neutrally in water, for example sulfates or chlorides, and dyes and fragrances.

Preferred surfactants of the sulfonate type are the known $C_{9-13}$ alkyl benzene sulfonates, olefin sulfonates and alkane sulfonates. Esters of α-sulfofatty acids and the disalts of α-sulfofatty acids are also suitable. Other suitable anionic surfactants are sulfonated fatty acid glycerol esters in the form of monoesters, diesters and triesters and mixtures thereof which are obtained in the esterification of a monoglycerol with 1 to 3 moles of fatty acid or in the transesterification of triglycerides with 0.3 to 2 moles of glycerol.

Suitable surfactants of the sulfate type are the sulfuric acid monoesters of primary alcohols of natural and synthetic origin, more particularly fatty alcohols, for example coconut oil fatty alcohol, tallow fatty alcohol, oleyl alcohol, lauryl, myristyl, cetyl or stearyl alcohol, or the $C_{10-20}$ oxo alcohols and those of secondary alcohols with the same chain length. Sulfuric acid monoesters of alcohols ethoxylated with 1 to 6 moles of ethylene oxide, such as 2-methyl-branched $C_{9-11}$ alcohols containing on average 2 or 3.5 moles of ethylene oxide are also suitable.

Preferred anionic surfactant mixtures contain combinations of alk(en)yl sulfates, more particularly mixtures of saturated and unsaturated fatty alcohol sulfates, and alkyl benzene sulfonates, sulfonated fatty acid glycerol esters and/or α-sulfofatty acid esters and/or alkyl sulfosuccinates. Mixtures containing alk(en)yl sulfates and alkyl benzene sulfonates and optionally α-sulfofatty acid methyl esters and/or sulfonated fatty acid glycerol esters as anionic surfactants are particularly preferred.

Other suitable anionic surfactants are, in particular, soaps, preferably in quantities below 5% by weight. Suitable soaps are saturated fatty acid soaps, such as the salts of lauric acid, myristic acid, palmitic acid or stearic acid, and soap mixtures derived in particular from natural fatty acids, for example coconut oil, palm kernel oil or tallow fatty acids. Unsaturated fatty acid soaps derived, for example, from oleic acid may also be present, although they should not make up more than 50% by weight of the soaps.

The anionic surfactants and soaps may be present in the form of their sodium, potassium or ammonium salts and as soluble salts of organic bases, such as mono-, di- or triethanolamine. The anionic surfactants are preferably present in the form of their sodium or potassium salts, more particularly in the form of their sodium salts. The anionic surfactant content of the detergents is generally between 5 and 40% by weight.

Preferred nonionic surfactants are alkoxylated, advantageously ethoxylated, alcohols, more particularly primary alcohols, preferably containing 8 to 18 carbon atoms and, on average, 1 to 12 moles of ethylene oxide (EO) per mole of alcohol, in which the alcohol radical may be linear or preferably 2-methyl-branched or may contain linear and methyl-branched radicals in admixture in the form in which they are typically present in oxo alcohol radicals. However, alcohol ethoxylates with linear residues of alcohols of natural origin containing 12 to 18 carbon atoms, for example from coconut oil, palm kernel oil, tallow fatty or oleyl alcohol, and on average 2 to 8 EO per mole of alcohol are particularly preferred. Preferred ethoxylated alcohols include, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned are statistical mean values which can be a whole number or a broken number for a particular product. Preferred alcohol ethoxylates have a narrow-range homolog distribution (narrow range ethoxylates, NRE). In addition to these nonionic surfactants, fatty alcohols containing more than 12 EO may also be used. Examples of such fatty alcohols are tallow fatty alcohol containing 14 EO, 25 EO, 30 EO or 40 EO.

Another class of preferred nonionic surfactants, which may be used either as sole nonionic surfactant or in combination with other nonionic surfactants, are alkoxylated, preferably ethoxylated or ethoxylated and propoxylated fatty acid alkyl esters, preferably containing 1 to 4 carbon atoms in the alkyl chain, more particularly the fatty acid methyl esters which are described, for example, in Japanese patent application JP 58/217598 or which are preferably produced by the process described in International patent application WO-A-90/13533.

Other suitable nonionic surfactants are alkyl glycosides corresponding to the general formula $RO(G)_x$ in which R is a primary linear or methyl-branched, more particularly 2-methyl-branched, aliphatic radical containing 8 to 22 and preferably 12 to 18 carbon atoms and G is a glycose unit containing 5 or 6 carbon atoms, preferably glucose. The degree of oligomerization x, which indicates the distribution of monoglycosides and oligoglycosides, is a number of 1 to 10 and preferably assumes a value of 1.2 to 1.4.

Other suitable surfactants are polyhydroxy fatty acid amides corresponding to formula (I):

in which $R^2CO$ is an aliphatic acyl group containing 6 to 22 carbon atoms, $R^3$ is hydrogen, an alkyl or hydroxyalkyl group containing 1 to 4 carbon atoms and |Z| is a linear or branched polyhydroxyalkyl group containing 3 to 10 carbon atoms and 3 to 10 hydroxyl groups.

The percentage content of nonionic surfactants in the detergents is generally from 2 to 25% by weight.

Any of the builders hitherto commonly used may be present as further inorganic builders. These include in particular zeolites, crystalline layer silicates, even phosphates, providing they are ecologically safe to use. Their content may vary over a wide range, depending on the content of the X-ray amorphous, overdried shard silicates according to the invention. The sum total of conventional builders and the silicates according to the invention is normally from 10 to 60% by weight.

Useful organic builders are, for example, the polycarboxylic acids preferably used in the form of their sodium salts, such as citric acid, adipic acid, succinic acid, glutaric acid, tartaric acid, sugar acids, amino-carboxylic acids, nitrilotriacetic acid (NTA), providing they are ecologically safe to use, and mixtures thereof. Preferred salts are the salts of the polycarboxylic acids, such as citric acid, adipic acid, succinic acid, glutaric acid, tartaric acid, sugar acids and mixtures thereof.

Suitable polymeric polycarboxylates are, for example, the sodium salts of polyacrylic acid or polymethacrylic acid, for example those with a relative molecular weight of 800 to 150,000 (based on acid). Suitable copolymeric polycarboxylates are, in particular, those of acrylic acid with methacrylic acid and of acrylic acid or methacrylic acid with maleic acid.

Acrylic acid/maleic acid copolymers containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000. Biodegradable terpolymers, for example those containing salts of acrylic acid and maleic acid and also vinyl alcohol or vinyl alcohol derivatives (DE-A 43 00 772) as monomers or those containing salts of acrylic acid and 2-alkyl allyl sulfonic acid and also sugar derivatives (DE-C 42 21 381) as monomers, are also particularly preferred.

Other suitable builder systems are oxidation products of carboxyfunctional polyglucosans and/or water-soluble salts thereof which are described, for example, in International patent application WO-A-93/08251 or of which the production is described, for example, in International patent application WO-A-93/16110 or in earlier German patent application P 43 30 393.0.

The detergents may also contain components which have a positive effect on the removability of oils and fats from fabrics by washing. This effect becomes particularly clear when a fabric, which has already been repeatedly washed with a detergent according to the invention containing this oil- and fat-dissolving component, is soiled. Preferred oil- and fat-dissolving components are, for example, nonionic cellulose ethers, such as methyl hydroxypropyl cellulose containing 15 to 30% by weight of methoxyl groups and 1 to 15% by weight of hydroxypropyl groups, based on the nonionic cellulose ether, and the polymers of phthalic acid and/or terephthalic or derivatives thereof known from the prior art, more particularly polymers of ethylene terephthalates and/or polyethylene glycol terephthalates.

In addition to the silicates, the detergents may also contain other water-soluble inorganic salts, such as bicarbonates and carbonates, preferably in the form of their alkali metal salts. The sodium carbonate content of the detergents may be, for example, up to about 20% by weight and is preferably between 5 and 15% by weight. In cases where the detergents contain more than 20% by weight of the silicates according to the invention, their sodium carbonate content is in particular up to about 10% by weight. According to the teaching of earlier German patent application P 43 19 578.4, alkali metal carbonates can also be replaced by sulfur-free amino acids containing 2 to 11 carbon atoms and, optionally, another carboxyl and/or amino group and/or salts thereof. According to the present invention, the alkali metal carbonates are preferably partly or completely replaced by glycine or glycinate.

Among the compounds yielding $H_2O_2$ in water which serve as bleaching agents, sodium perborate tetrahydrate and sodium perborate monohydrate are particularly important. Other useful bleaching agents are, for example, sodium percarbonate, peroxypyrophosphates, citrate perhydrates and also $H_2O_2$-yielding peracidic salts or peracids, such as perbenzoates, peroxophthalates, diperazelaic acid or diperdodecanedioic acid. The content of bleaching agents in the detergents is preferably from 5 to 25% by weight and more preferably from 10 to 20% by weight, perborate monohydrate advantageously being used.

To obtain an improved bleaching effect where washing is carried at temperatures of 60° C. or lower, bleach activators may be incorporated in the detergents. Examples of bleach activators are N-acyl or O-acyl compounds which form organic peracids with $H_2O_2$, preferably N,N'-tetraacylated diamines, p-(alkanoyloxy)-benzene sulfonates, and also carboxylic anhydrides and esters of polyols, such as glucose pentaacetate. Other known bleach activators are acetylated mixtures of sorbitol and mannitol of the type described, for example, in European patent application EP-A-0 525 239. The content of bleach activators in the detergents containing bleaching agents is in the usual range, preferably from 1 to 10% by weight and more preferably from 3 to 8% by weight. Particularly preferred bleach activators are N,N,N',N'-tetraacetyl ethylenediamine (TAED), 1,5-diacetyl-2,4-dioxohexahydro-1,3,5-triazine (DADHT) and acetylated sorbitol/mannitol mixtures (SORMAN).

It can be of advantage to add typical foam inhibitors to the detergents where they are used in washing machines. Suitable foam inhibitors are, for example, soaps of natural or synthetic origin with a high percentage content of $C_{18-24}$ fatty acids. Suitable non-surface-active foam inhibitors are, for example, organopolysiloxanes and mixtures thereof with microfine, optionally silanized silica and also paraffins, waxes, microcrystalline waxes and mixtures thereof with silanized silica or bis-stearyl ethylenediamide. Mixtures of various foam inhibitors, for example mixtures of silicones, paraffins or waxes, may also be used with advantage. The foam inhibitors, more particularly silicone- or paraffin-containing foam inhibitors, are preferably fixed to a granular water-soluble or water-dispersible support. Mixtures of paraffins and bis-stearyl ethylenediamides are particularly preferred.

Suitable enzymes are those from the class of proteases, lipases, amylases, cellulases and mixtures thereof. Enzymes obtained from bacterial strains or fungi, such as *Bacillus subtilis, Bacillus licheniformis* and *Streptomyces griseus*, are particularly suitable. Proteases of the subtilisin type, more particularly proteases obtained from *Bacillus lentus*, are preferably used. Enzyme mixtures, for example of protease and amylase or protease and lipase or protease and cellulase or of cellulase and lipase or of protease, amylase and lipase or protease, lipase and cellulase, but especially cellulase-containing mixtures, are of particular interest. Peroxidases or oxidases have also proved to be suitable in some cases. The enzymes may be fixed to supports and/or encapsulated in shell-forming substances to protect them against premature decomposition. The percentage content of enzymes, enzyme mixtures or enzyme granules may be, for example, from about 0.1 to 5% by weight and is preferably from 0.1 to about 2% by weight.

Suitable stabilizers, more particularly for per compounds and enzymes, are the salts of polyphosphonic acids, more particularly 1-hydroxyethane-1,1-diphosphonic acid (HEDP), diethylenetriamine pentamethylene phosphonic acid (DETPMP) or ethylenediamine tetramethylene phosphonic acid (EDTMP).

The function of redeposition inhibitors is to keep the soil detached from the fibers suspended in the liquor and thus to prevent discoloration. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc. may also be used. Polyvinyl pyrrolidone is also suitable. However, cellulose ethers, such as carboxymethyl cellulose (Na salt), methyl cellulose, hydroxyalkyl cellulose and mixed ethers, such as methyl hydroxyethyl cellulose, methyl hydroxypropyl cellulose, methyl carboxymethyl cellulose and mixtures thereof, and also polyvinyl pyrrolidone are preferably used, for example in quantities of 0.1 to 5% by weight, based on the detergent.

The detergents may contain derivatives of diaminostilbene disulfonic acid and alkali metal salts thereof as optical brighteners. Suitable optical brighteners are, for example, salts of 4,4'-bis-(2-anilino-4-morpholino-1,3,5-triazinyl-6-amino)-stilbene-2,2'-disulfonic acid or compounds of similar structure which contain a diethanolamino group, a methylamino group, an anilino group or a 2-methoxyethylamino group instead of the morpholino group. Brighteners of the substituted diphenyl-styryl type, for example alkali metal salts of 4,4'-bis-(2-sulfostyryl)-diphenyl, 4,4'-bis-(4-chloro-3-sulfostyryl)-diphenyl or 4-(4-chlorostyryl)-4'-(2-sulfostyryl)-diphenyl, may also be present. Mixtures of the brighteners mentioned above may also be used.

The present invention also relates to granular silicate compounds which, in addition to the X-ray amorphous shard silicates according to the invention, contain at least one other solid component which is normally a detergent ingredient.

In one preferred embodiment, the compounds contain X-ray amorphous shard silicates and zeolite in a ratio by weight of preferably 3:1 to 1:3, based on the water-containing substances, and more preferably in a ratio by weight of 2:1 to 1:2. Other possible ingredients of these zeolite/X-ray amorphous silicate compounds are advantageously sodium carbonate, preferably in a quantity of up to 5% by weight, based on the compound, and also bicarbonates, sulfates, bisulfates and optical brighteners. In another preferred embodiment, the zeolite/X-ray amorphous silicate compounds also contain co-builders, such as citrate, aspartic acid or aspartate, phosphates, polymeric polycarboxylates, polyaspartic acid and/or oxidized starches. Their content is preferably no more than 20% by weight, based on the compound. In another embodiment, the zeolite/X-ray amorphous silicate compounds may also contain anionic surfactants, above all alkyl benzene sulfonates and/or alkyl sulfates, again in quantities of at most 20% by weight and preferably in quantities of at most 15% by weight. It is important in this regard to bear in mind that the content of zeolite and X-ray amorphous shard silicates in the compounds is preferably at least 50% by weight to 100% by weight and more preferably 60% by weight to 100% by weight. The content of the compounds in the final detergent is preferably from 0.5 to 10% by weight and more preferably from 1 to 8% by weight, for example from 2 to 5% by weight.

In another preferred embodiment, the compounds contain X-ray amorphous shard silicates and—compulsorily—co-builders, preferably citric acid/citrate, aspartic acid/aspartate, polymeric polycarboxylates, polyaspartic acid, phosphonates and/or oxidized starches. In this case, the ratio by weight of X-ray amorphous silicates to co-builder is preferably above 1. Like those mentioned above, these compounds may also contain (bi)carbonates, (bi)sulfates and/or optical brighteners, the content of these ingredients again advantageously being limited to at most 5% by weight. The above-mentioned anionic surfactants may also be present in the quantities mentioned. The final detergent contains the co-builder/X-ray amorphous silicate compounds in such quantities that the detergent contains a total of 10 to 15% by weight of silicates and 10 to 15% by weight of zeolite and, preferably, 5 to 10% by weight of citrates, 5% by weight of polymeric polycarboxylates and around 1% by weight of phosphonate. By contrast, detergents containing less than 5% by weight of zeolite contain such quantities of co-builder/X-ray amorphous silicate compounds that they contain a total of 20 to 30% by weight of silicate and preferably 5 to 10% by weight of citric acid/citrate, 0 to 10% by weight and more particularly 5 to 10% by weight of polymeric polycarboxylates or polyaspartic acid or oxidized starch and about 1% by weight of phosphonate.

In another embodiment of the invention, the compounds contain X-ray shard-form silicates and—compulsorily—surfactants, preferably anionic and nonionic surfactants. The compounds may contain as further ingredients (bi)carbonate, (bi)sulfate, optical brighteners, preferably again in maximum quantities of 5% by weight, based on the compound, and the co-builders mentioned above. The content of surfactant/X-ray amorphous silicate compounds in the detergents is again such that 10 to 15% by weight of silicates are present in zeolite-containing detergents with a zeolite content of 10 to 15% by weight. In formulations containing less than 5% by weight of zeolite, the surfactant/X-ray amorphous silicate compounds are present in such quantities that the detergents contain a total of 20 to 30% by weight of silicate.

In another preferred embodiment, the compounds contain X-ray amorphous shard-form silicates and peroxy bleaching agents. Suitable bleaching agents are, in particular, perborate or optionally stabilized percarbonate. Other ingredients of these compounds may be the above-mentioned surfactants, co-builders and inorganic salts. The content of bleaching agent/X-ray amorphous silicate compounds in the final detergent is preferably such that the detergent contains a total of 15 to 30% by weight of silicate and 15 to 25% by weight of peroxy bleaching agents.

In another embodiment, the compounds contain X-ray amorphous shard-form silicates and foam inhibitors, preferably paraffins, silicones or mixtures thereof. The content of foam inhibitors in these compounds may be up to 10% by weight and is preferably up to 5% by weight. The foam inhibitor/X-ray amorphous silicate compounds may contain the above-mentioned co-builders, surfactants, inorganic salts and/or optical brighteners mentioned above.

In the same way as the pure silicates, all the compounds mentioned are capable of absorbing liquid auxiliaries and useful materials and may be impregnated therewith.

There are several possible methods for the production of the compounds according to the invention. In one variant, not only the silicates, but mixtures of the silicates with the other ingredients of the compounds are treated as described during the drying of a water-containing sodium silicate preparation using a hot gas phase as the drying medium and/or during the heating of a spray-dried sodium silicate containing at least 15% by weight of water, although only mixtures which still guarantee the formation of the shard structure can be processed. Another possible method of producing compounds containing X-ray amorphous shard silicates comprises initially preparing the X-ray amorphous shard silicates according to the invention as described and then compounding them in known manner with the other ingredients of the compounds. The compounding step may be carried out by granulation, extrusion or roller compaction. In another preparation step, the compounds may then be treated with liquid and also with solid components and then mixed, granulated or extruded as a multi-material component with other detergent ingredients to form the final detergent.

The apparent density of the preferred granular detergents containing the silicate or silicate compounds according to the invention is generally in the range from 300 to 1200 g/l and preferably in the range from 500 to 1100 g/l. Detergents with apparent densities of at least 700 g/l are most particularly preferred. They may be produced by any of the known methods, such as mixing, spray drying, granulation and extrusion, the X-ray amorphous overdried silicates according to the invention and preferably the silicates charged with liquid useful materials from the field of detergents, more particularly nonionic surfactants, advantageously being added to and mixed with the other components of the detergent. Processes in which several individual components, for example spray-dried components and granulated and/or extruded components, are mixed with one another are particularly suitable. It is preferred, particularly in granulation and extrusion processes, to use the anionic surfactants optionally present in the form of a spray-dried, granulated or extruded compound either as a mixing component to be incorporated in the processes mentioned or as an additive to other granules. It is also possible and—depending on the formulation—can also be of advantage subsequently to add other individual constituents of the detergent, for example carbonates, citrate or citric acid or other polycarboxylates or polycarboxylic acids, polymeric polycarboxylates, zeolite and/or layer silicates, for example layer-form crystalline disilicates, to spray-dried, granulated and/or extruded components.

EXAMPLES

Example 1

Production of X-ray amorphous overdried silicates

In a turbodryer/granulator (manufacturer: Vomm, Italy), a 55% by weight aqueous waterglass solution ($Na_2O$:$SiO_2$ 1:2.0) was dried at a temperature of the heating gas (air) of 250° C. and over a residence time of 60 seconds to form an X-ray amorphous shard silicate with a water content of 7.6% by weight. A similar result was obtained when the waterglass solution spent only 20 seconds in the turbodryer/granulator in a first drying step and the partly dried material was exposed to another two drying steps each lasting 20 seconds in the turbo-dryer/granulator.

The calcium binding capacity of this X-ray amorphous overdried silicate was determined potentiometrically with an Orion calcium-sensitive electrode. To this end, 1 liter of water with a hardness of 30° d (corresponding to 30 mg CaO/l) was introduced into a glass vessel thermostatically controlled to 25° C. and was then adjusted to pH 11.5 with sodium hydroxide and to a 0.08 molar potassium chloride solution with potassium chloride to simulate an electrolyte content typical of a detergent. Quantities of 1 g of the substance to be tested were dissolved in 5 ml of ethanol and added with stirring to the potassium chloride solution. The reduction in calcium hardness was determined by computer as a function of time (residual hardness).

The calcium binding capacity of the X-ray amorphous overdried silicate showed a residual hardness of 3° d after 300 seconds. Surprisingly, however, the residual hardness continued gradually to increase, reaching a value of 7.5° d after 1200 seconds. Although the phenomenon of the continuing increase in residual hardness has not yet been explained, it is clear that X-ray amorphous overdried silicates according to the invention very quickly bind the hardness salt, calcium.

In a Comparison Example, the calcium binding capacity of a crystalline layer-form disilicate (SKS 6®, a product of Hoechst AG) was measured. In this case, no anomaly of a reduction in residual water hardness with a subsequent re-increase over the observation period was found. Nevertheless, the residual water hardness in the case of SKS 6® was around 27° d after 300 seconds and 24.4° d after 1200 seconds.

In another test, the dissolving rates were determined by measuring the times in which 80% by weight and 95% by weight of 5 g of the silicate dissolved in 500 g of demineralized water in a stirred vessel at 40° C. (concentration measurement via conductivity). Dissolving times of 16 seconds (80%) and 25 seconds (95%) were determined. For comparison, the test was repeated with SKS 6®. In this case, dissolving times of 52 seconds (80%) and 80 seconds (95%) were determined.

In addition, the specific BET surface of the X-ray amorphous silicate (DIN 66131; sample preparation: 200° C./$10^{-6}$ torr) was determined in a further test. A value for the specific surface of 13.4 $m^2$/g was determined.

Example 2

Inhibition of incrustation

Granular detergents with the following composition (detergent D1 according to the invention and comparison detergent C1) were conventionally mixed together and tested. Detergent D1 according to the invention contains an X-ray amorphous overdried silicate according to Example 1 as the silicate builder while the comparison detergent contained SKS 6®.

| Composition | (In % by weight) |
| --- | --- |
| Tallow fatty alcohol sulfate | 8.5 |
| $C_{12-18}$ fatty alcohol · 5 EO | 16.5 |

-continued

| Composition | (In % by weight) |
|---|---|
| Tallow fatty alcohol · 5 EO | 1.8 |
| $C_{12-18}$ fatty acid soap sodium salt | 0.8 |
| Silicate builder | 34.0 |
| Perborate monohydrate | 16.0 |
| TAED | 6.0 |
| Polyethylene glycol (relative molecular weight 400) | 2.0 |
| Protease | 1.24 |
| Granular foam inhibitor based on silicone oil | 0.6 |
| Sodium sulfate and water | Balance |

The test was carried out under simulated practical conditions in domestic washing machines. To this end, the machines were loaded with 3.0 kg of clean ballast washing and 0.5 kg of test fabrics, part of the test fabrics being impregnated with typical test soils to determine primary washing power and part consisting of white fabric to determine secondary washing power. Strips of standardized cotton fabric (Wäschereiforschungsanstalt Krefeld, WFK), knitted fabric (cotton tricot, B), grey cotton cloth (GC) and terry (T) were used as the test fabrics.

Washing conditions:

tapwater with a hardness of 23° d (equivalent to 230 mg CaO/l), quantity of detergent used per detergent and machine 80 g, 90° C. wash program (including heating phase), liquor ratio (kg washing: liter wash liquor in the main wash cycle) 1:5.7 4x rinsing with tapwater, spin-drying, drying.

The primary washing powers of detergents D1 and C1 were comparable.

After 25 wash cycles, the ash content of the fabric samples was quantitatively determined. The detergent D1 according to the invention showed better ash contents than the comparison detergent C1 both on the individual fabrics except for the knitted fabric (B) and also on average over all the fabrics.

TABLE 1

| | % By Weight Ash | | | | |
|---|---|---|---|---|---|
| | T | GC | B | WFK | φ |
| Initial value | 0.55 | 0.12 | 0.72 | 0.28 | 0.42 |
| D1 | 1.92 | 1.95 | 1.81 | 4.48 | 2.54 |
| C1 | 2.18 | 2.75 | 1.38 | 4.58 | 2.72 |

Example 3

Charging of X-ray amorphous overdried silicates

In a commercial mixer, 1 kg of the X-ray amorphous overdried silicate of Example 1 was charged for 2 minutes with $C_{12-18}$ fatty alcohol• 5 EO and $C_{12-14}$ fatty alcohol• 3 EO in a ratio by weight of 80:20. For comparison, this Example was repeated with zeolite powder and SKS 6®. Table 2 shows the quantities of nonionic surfactant which can be absorbed by the particular support without any reduction in the flow properties of the impregnated products.

TABLE 2

Charging of various support materials with nonionic surfactant

| Support (1 kg) | Quantity of Nonionic Surfactant (in kg) |
|---|---|
| Silicate of Example 1 | 2.4 |
| Zeolite powder | 0.22 |
| SKS 6 ® | 0.68 |

What is claimed is:

1. Sodium silicates having a molar ratio of $SiO_2$ to $Na_2O$ of 1.3 to 4 in the form of an absorbent, fine-particle solid in shard form having the property of reducing incrustation when used as a builder component In a detergent composition, said sodium silicates further being in the form of an X-ray amorphous overdried material with a water content below 15% by weight and having an apparent density of 500 g/l or lower which has been produced by drying of a water-containing sodium silicate composition using a hot gas phase as the drying medium or by heating of a spray-dried sodium silicate having a water content of at least 15% by weight at a temperature of 120° C. to 450° C., accompanied or followed by the application of forces to the sodium silicates to produce the shard structure, said sodium silicates having a specific BET surface of at least 5 $M^2/g$, and a cumulative volume of at least 100 $mm^3/g$.

2. Sodium silicates as in claim 1 having an apparent density of at most 400 g/l.

3. Sodium silicates as in claim 1 having a particle size of 10 μm to 200 μm, and a wall thickness of 1 μm to 5 μm.

4. Sodium silicates as in claim 1 containing microcrystalline solids as determined by electron diffraction.

5. Sodium silicates as in claim 1 wherein their molar ratio of $SiO_2$ to $Na_2O$ values differ by at least 5% by weight from the molar ratio of 2.

6. Sodium silicates as in claim 1 which are capable of absorbing at least equal quantities by weight of a liquid without losing their free-flow property.

7. Sodium silicates as in claim 1 having residual water contents of from 6% to 13% by weight.

8. Sodium silicates as in claim 1 having a dissolving rate in water at 40° C. of at most 1 minute.

9. The process of producing sodium silicates having a molar ratio of $SiO_2$, to $Na_2O$ of 1.3 to 4 in the form of an absorbent, fine-particle solid in shard form, comprising drying a water-containing sodium silicate composition with a hot gas phase as the drying medium or by heating a spray-dried sodium silicate composition having a water content of at least 15% by weight at a temperature of 120° C. to 450° C. to provide an X-ray amorphous overdried material having a water content below 15% by weight and an apparent density of 500 g/l or lower, and simultaneously or subsequently applying force to said sodium silicates to produce the shard form and wherein said sodium silicates have a specific BET surface of at least 5 $m^2/g$ and a cumulative volume of at least 100 $mm^3 g$.

10. A process as in claim 9 wherein said sodium silicates are dried in a turbodryer and have an apparent density of below 400 g/l.

11. A process as in claim 9 wherein said sodium silicates have a particle size of 10 μm to 200 μm, and a wall thickness of 1 μm to 5 μm.

12. A process as in claim 9 including mixing said sodium silicates with at least an equal weight quantity of a liquid component while maintaining the free-flow property of the mixture.

13. A detergent composition containing sodium silicates having a molar ratio of $SiO_2$ to $Na_2O$ of 1.3 to 4 in the form of an absorbent, fine-particle solid in shard form having the property of reducing incrustation, said sodium silicates further being in the form of an X-ray amorphous overdried material with a water content below 15% by weight and having an apparent density of 500 g/l or lower which has been produced by drying of a water-containing sodium silicate composition using a hot gas phase as the drying medium or by heating of a spray-dried sodium silicate having a water content of at least 15% by weight at a temperature of 120° C. to 450° C., accompanied or followed by the application of forces to the sodium silicates to produce the shard structure and wherein said sodium silicates have a specific BET surface of at least 5 $m^2/g$, and a cumulative volume of at least 100 $mm^3/g$.

14. A detergent composition as in claim 13 wherein said sodium silicates have an apparent density of at most 400 g/l.

15. A detergent composition as in claim 13 wherein said sodium silicates have a particle size of 10 μm to 200 μm, and a wall thickness of 1 μm to 5 μm.

16. A detergent composition as in claim 13 wherein said sodium silicates contain microcrystalline solids as determined by electron diffraction.

17. A detergent composition as in claim 13 wherein said sodium silicates contain at least an equal weight quantity of a liquid component.

18. A detergent composition as in claim 13 wherein said sodium silicates have a dissolving rate in water at 40° C. of at most 1 minute.

19. A detergent composition as in claim 13 containing zeolite in a weight ratio of 3:1 to 1:3 with respect to said sodium silicates.

20. A detergent composition as in claim 13 containing a co-builder component wherein the weight ratio of said sodium silicates to said co-builder component is greater than 1.

21. A detergent composition as in claim 13 containing a surfactant.

22. A detergent composition as in claim 21 wherein said surfactant is selected from the group consisting of anionic and nonionic surfactants.

23. A detergent composition as in claim 13 containing a peroxy bleaching agent.

24. A detergent composition as in claim 23 containing a foam inhibitor.

* * * * *